US007486944B2

(12) United States Patent
Carpenter et al.

(10) Patent No.: US 7,486,944 B2
(45) Date of Patent: Feb. 3, 2009

(54) METHOD FOR MANAGING WIRELESS TELECOMMUNICATIONS BILLS

(75) Inventors: Ronald Vaiden Carpenter, Warm Springs, VA (US); Kae Kimberly Zulager, Warm Springs, VA (US)

(73) Assignee: The Bill Police LLC, Richmond, VA (US)

( * ) Notice: Subject to any disclaimer, the term of this patent is extended or adjusted under 35 U.S.C. 154(b) by 226 days.

(21) Appl. No.: 10/675,501

(22) Filed: Sep. 30, 2003

(65) Prior Publication Data

US 2004/0067747 A1 Apr. 8, 2004

Related U.S. Application Data

(60) Provisional application No. 60/415,365, filed on Oct. 2, 2002.

(51) Int. Cl.
  *H04M 11/00* (2006.01)
(52) U.S. Cl. .................. 455/406; 455/405; 455/407; 455/566; 705/52; 705/53; 705/54
(58) Field of Classification Search .......... 455/406, 455/405, 407, 408; 705/52, 53, 54; 379/121.02, 379/121.05
  See application file for complete search history.

(56) References Cited

U.S. PATENT DOCUMENTS

| 5,027,388 | A | * | 6/1991 | Bradshaw et al. ........ 379/114.1 |
| 5,287,270 | A | | 2/1994 | Hardy et al. |
| 5,483,445 | A | | 1/1996 | Pickering |
| 5,649,115 | A | | 7/1997 | Schrader |
| 5,659,601 | A | * | 8/1997 | Cheslog ................. 379/121.02 |
| 5,684,965 | A | | 11/1997 | Pickering |
| 5,696,906 | A | | 12/1997 | Peters et al. |
| 5,978,780 | A | | 11/1999 | Watson |
| 6,125,173 | A | * | 9/2000 | Jagadish et al. .......... 379/114.1 |
| 6,128,603 | A | | 10/2000 | Dent et al. |
| 6,434,537 | B1 | | 8/2002 | Grimes |
| 6,574,465 | B2 | * | 6/2003 | Marsh et al. .............. 455/406 |
| 6,606,377 | B2 | * | 8/2003 | Ruckart et al. ......... 379/121.02 |
| 6,615,034 | B1 | * | 9/2003 | Alloune et al. ............ 455/406 |
| 6,631,185 | B1 | * | 10/2003 | Fleming, III ........... 379/121.02 |
| 6,892,063 | B2 | * | 5/2005 | Savolainen ............... 455/405 |
| 6,968,319 | B1 | * | 11/2005 | Remington et al. ......... 705/40 |
| 7,072,639 | B2 | * | 7/2006 | Marsh et al. .............. 455/406 |
| 2001/0037269 | A1 | | 11/2001 | Marsh et al. |
| 2002/0026341 | A1 | | 2/2002 | Marsh et al. |
| 2002/0026394 | A1 | | 2/2002 | Savage et al. |
| 2002/0046147 | A1 | | 4/2002 | Livesay et al. |
| 2002/0059139 | A1 | | 5/2002 | Evans |
| 2002/0082991 | A1 | * | 6/2002 | Friedman et al. ............ 705/40 |
| 2002/0120540 | A1 | * | 8/2002 | Kende et al. ................ 705/35 |

(Continued)

FOREIGN PATENT DOCUMENTS

WO  PCT/US98/15687  3/1999

*Primary Examiner*—Charles N Appiah
*Assistant Examiner*—Randy Peaches
(74) *Attorney, Agent, or Firm*—Townsend and Townsend and Crew LLP (57) ABSTRACT

A method manages wireless telecommunications bills for end user subscribers. The method includes complete bill management for the wireless subscribers including, for example, establishing a baseline report, receiving and analyzing a subscriber bill, and requesting and posting credits from wireless telecommunication providers. The method includes the creation of the baseline report in order to manage common billing components across all wireless carriers and carrier plans.

12 Claims, 6 Drawing Sheets

U.S. PATENT DOCUMENTS

| | | |
|---|---|---|
| 2002/0123949 A1 | 9/2002 | VanLeeuwen |
| 2002/0138378 A1 | 9/2002 | Leskuski |
| 2003/0036918 A1 | 2/2003 | Pintsov |
| 2003/0083968 A1 | 5/2003 | Marsh et al. |
| 2003/0216971 A1* | 11/2003 | Sick et al. ................. 705/26 |
| 2004/0203587 A1* | 10/2004 | Bekanich ................. 455/407 |

* cited by examiner

| ABC Company | Total BASELINE | Total ACTUAL | Total PRIOR | Total Savings |
|---|---|---|---|---|
| Access fees | $ 1,524.75 | $ 1,524.75 | $ 1,561.99 | $ 37.24 |
| Cellular Minutes Used | 7,017 | 7,303 | 7,017 | (286) |
| Cellular Minutes Included | 10,100 | 11,100 | 11,400 | 300 |
| N/W minutes used | | | | |
| N/W minutes Included | | | | |
| Intercompany minutes used | 8,590 | 7,951 | 8,590 | 639 |
| Intercompany minutes included | 280,000 | 280,000 | 280,000 | - |
| Cost of local use | | 0.25 | | (0.25) |
| Roaming fees | $ - | $ - | $ - | $ - |
| Toll Charges | $ - | $ - | $ 257.84 | $ 257.84 |
| Additional charges | $ - | $ - | $ - | $ - |
| Group Calling | $ - | 19.80 | $ - | (19.80) |
| Voice mail | $ - | - | $ 42.00 | 42.00 |
| Numeric Paging | $ - | - | $ - | - |
| Text Paging | $ - | 6.30 | $ - | (6.30) |
| Caller ID | $ - | - | $ 36.00 | 36.00 |
| Call forwarding | $ - | - | $ - | - |
| 3-way calling | $ - | - | $ - | - |
| Detailed Billing | $ - | - | $ - | - |
| Insurance | 110.60 | 110.60 | $ - | (110.60) |
| Interconnect Fees | $ - | - | $ - | - |
| Directory Assistance | $ - | 1.19 | $ 9.30 | 8.11 |
| Activation Fee | $ - | - | $ - | - |
| Credit Received | $ - | (78.34) | $ - | 78.34 |
| Access fee credit | $ - | - | $ 132.35 | 132.35 |
| Additional Charges and Credits | $ - | 32.20 | $ - | (32.20) |
| Taxes | $ - | 184.68 | $ - | (184.68) |
| Total bill | $ 1,635.35 | $ 1,801.43 | $ 2,039.48 | $ 238.05 |
| to pay with taxes | | (PAY) | | |
| Minus Taxes (original projection) | $ 1,635.35 | $ 1,616.75 | $ 2,039.48 | $ 422.73 |
| | | | | $ 5,072.76 |

Overall Carrier One credit $ 19.80
Overall Carrier Two credit

TOTAL CREDITS DUE $ 19.80

422.73

| Running Total Savings | |
|---|---|
| Savings Month 1 | $ 385.75 |
| Savings Month 2 | $ 221.56 |
| Savings Month 3 | $ 434.84 |
| Savings Month 4 | $ 420.12 |
| Savings Month 5 | $ 648.11 |
| Savings Month 6 | $ 422.73 |
| Savings Month 7 | |
| Savings Month 8 | |
| Savings Month 9 | |
| Savings Month 10 | |
| Savings Month 11 | |
| Savings Month 12 | |
| Savings Month 13 | |
| TOTAL | $ 2,533.11 |

METHOD FOR MANAGING WIRELESS TELECOMMUNICATIONS BILLS

This application claims the benefit of U.S. Provisional Application No. 60/415,365, filed Oct. 2, 2002, which is incorporated by reference herein as if set forth in its entirety.

The present invention is directed to a method of wireless telecommunication bill management for end user subscribers. The method provides complete bill management for wireless subscribers including, for example, establishing a baseline report, receiving and analyzing a subscriber bill, requesting and posting credits from wireless telecommunication providers.

BACKGROUND OF THE INVENTION

Cellular phone bills are confusing and difficult to manage. Federal Communications Commission statistics from the fourth quarter of 2001 show 1,323 of 2,423 complaints relating to wireless service were about billing. This illustrates obvious confusion and dissatisfaction with the billing process. Businesses are especially susceptible to extraordinary costs due to the variable nature of the rate plans and usage; it is one of the few costs that is billed by the minute and therefore can significantly change by an hour or two of extra usage. Typically, subscribers do not know how to read their communications bill, and because of this, subscribers are often being billed incorrectly. This frequently results in significantly higher bills than necessary and mismatched applications of technology.

According to the Strategis group, "Wireless voice service has reached a commodity status, whereby all carriers across the United States offer voice minutes to subscribers at very competitive rates" (US cellular/PCS marketplace: outlook and forecasts, 2001). This translates to three important factors in the wireless market today: 1. Because the carriers are marketing based on commodity pricing, they are more focused on the consumer market and not the business market. 2. Because the commodity prices continue to fall, there are not only decreasing margins on rate plans, but also are offering a greater number of rate plans. Therefore, as their own margins decrease, carriers are not rewarded to service these customers proactively, nor are they rewarded to make the bills correct. 3. Because the commodity structure now focuses on price, carriers gain subscriber adds by lowering rate plans. These prices are falling an average of 5% per year.

Presently, any subscriber can manage his or her own wireless bill; however, this requires them to have:

1. Billing knowledge to insure they can correctly read a bill to determine its format and what is it telling the user.
2. Wireless knowledge to confirm the rate plans that are supposed to be billed are in fact the ones that are being billed and the details of the plan (minutes, coverage areas, features etc) are equivalent to what their plan offers.
3. The format to simplify the process and enable the user to identify comparisons to a baseline.
4. Wireless carrier knowledge to negotiate through the carrier end of the billing cycle to get credits posted. Although the layperson may be able to have some of these processes in place, they probably do not have all and thus cannot implement the same process as the discussed method.

In addition, some of the carriers are offering services to help subscribers onto a better rate plan if the subscriber initiates a call to a national customer service number and asks for a better rate plan. Further, some of the national account managers for carriers will sometimes meet with larger subscribers to go over new options. However, the options suggested usually are changes that reflect a financial benefit to the carrier and require action to be taken by the end user. This inquiry also takes the end user's time and also requires that the user will have some level of wireless expertise on which to make a decision.

Also, all billing systems that have been created are in the best interest of the carriers to make their billing easier to distribute to end users. The typical "bill management" searches reveal creations or enhancements to systems that are used by the carrier. Although the message being conveyed is a rate plan analysis, most information provided here is not using a baseline for comparison, nor does it have the best interest of the end user in mind.

SUMMARY OF THE INVENTION

What is needed is a method that capitalizes on the carriers' deficiencies and makes them significant business opportunities. The method described herein does this in several ways: first, the process focuses on management of the business subscribers. The problem is that the subscriber does not have the expertise to look at the bill, find the billing error, nor have the mechanism to know how to go about fixing it and making sure it is fixed once it has been identified. In the present method, errors are easily spotted after a baseline has been established. Further, errors are not only fixed, but followed-up on to confirm credits have posted. It is important to note that this process takes place proactively, so the subscriber is made aware of it without any investment of time on the part of the subscriber.

Second, because of the myriad pricing options, subscribers are often unsure about what price plan they purchased, what is included in that plan, what features are included, and how the specific plan should look on the bill. Establishing the baseline report makes the process more understood.

Third, because rates are falling, the method described herein may include a mechanism to alert a subscriber (again proactively) to a new rate plan that has come out (carriers will often make significant changes to their rate plan scheme about every 6 months) which will lower their rates.

DETAILED DESCRIPTION OF THE INVENTION

Figure 1:
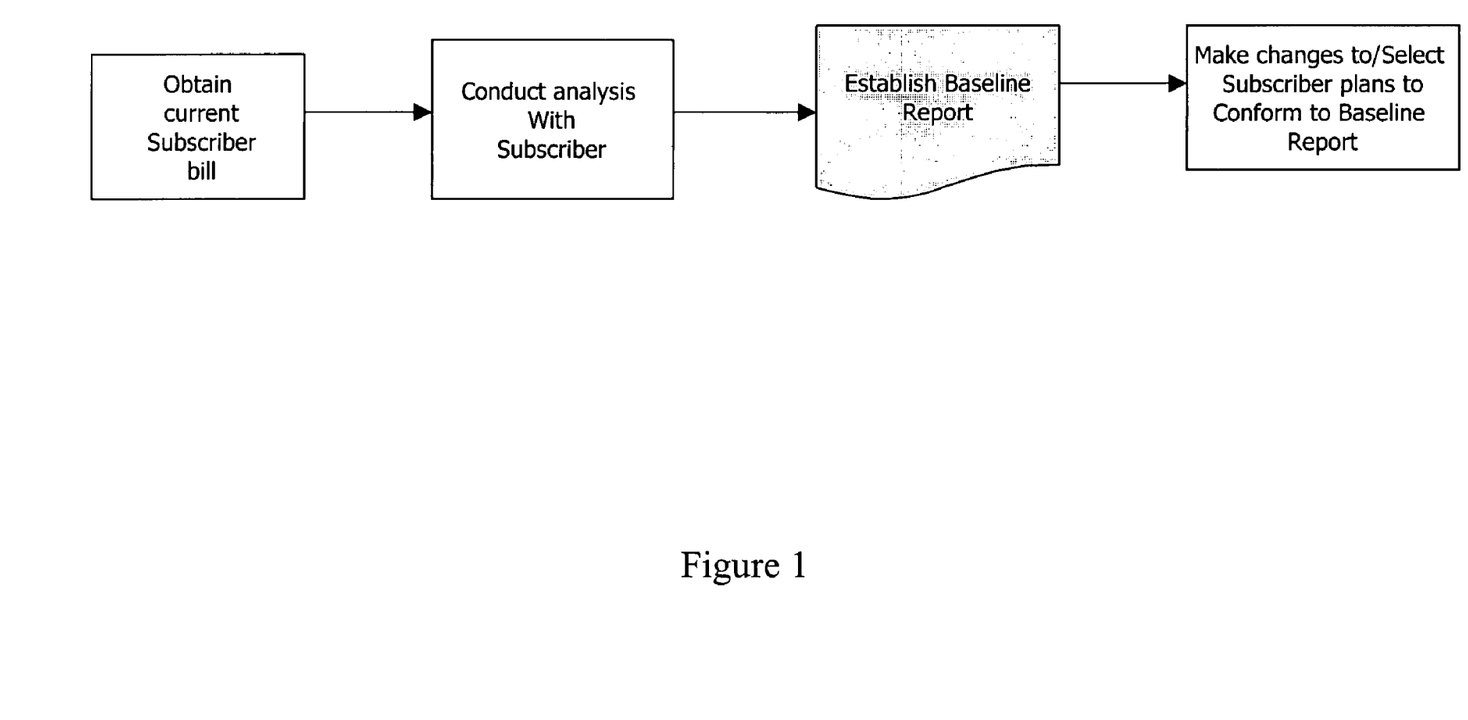
FIGS. 1-3 are flow charts demonstrating alternative steps in the method described herein.

The fundamental component of the invention is the baseline template report (see FIG. 1). The baseline report is the basis for the process and the point from which all analysis takes place; it is created in order to manage common billing components across all wireless carriers. The baseline is derived from the subscriber's account including number of wireless users, their minutes of use, calling patterns, coverage requirements and feature needs. From this, a template (baseline report) is created to define the best rate plan fit to conform to the subscriber's usage. The plan that best conforms to the baseline report of usage requirements may be a single rate plan from a single carrier. It may be determined that the baseline calls for a plurality of plans from the same and/or different plan carriers. The baseline report also defines what the wireless bill should look like each month. After the baseline is created, analysis is conducted both retrospectively each month to compare actual usage and billing to the baseline and prospectively to compare the usage to other potential rate plans or carriers.

To be useful across all wireless carriers, the baseline template must contain several common denominators. For example, all carriers have access fees and measure costs by minutes of use, so these are two mandatory components of the baseline template. Further, the baseline must include all users denoted by name, phone number and rate plan. It must show the minutes of use broken down between any categories of time (e.g. minutes of use for peak, off-peak, nights and weekends, etc.). It is also important that any additional details of the rate plans with associated costs are documented. This will enable the total sum of the fees and services for each person to compare directly to the carrier's costs each month. (When the actual bill is compared to the baseline each month, it is calculated to match the carrier bill to the penny. This not only allows for direct cost and service comparison, but also allows the subscriber to pay the bill directly from the baseline statement and never have to look at the carrier bill at all). The baseline also needs to have the current dates and baseline versions to show any changes that have been made to the baseline and the date of the baseline change. (E.g. if the subscriber changes the number of users, this will change the baseline. This change needs to be documented in order for the baseline comparisons to be meaningful). The baseline needs to show to the subscriber that the account was being billed before the management of the account to show financial and time savings for the baseline compared to before the baseline was created. Finally, as a key measurement of the bill maintenance, the baseline needs to reflect average cost per phone and average cost per minute. In actual monthly reports, this amount is compared to the baseline report to measure maintenance efficacy.

Figure 2:
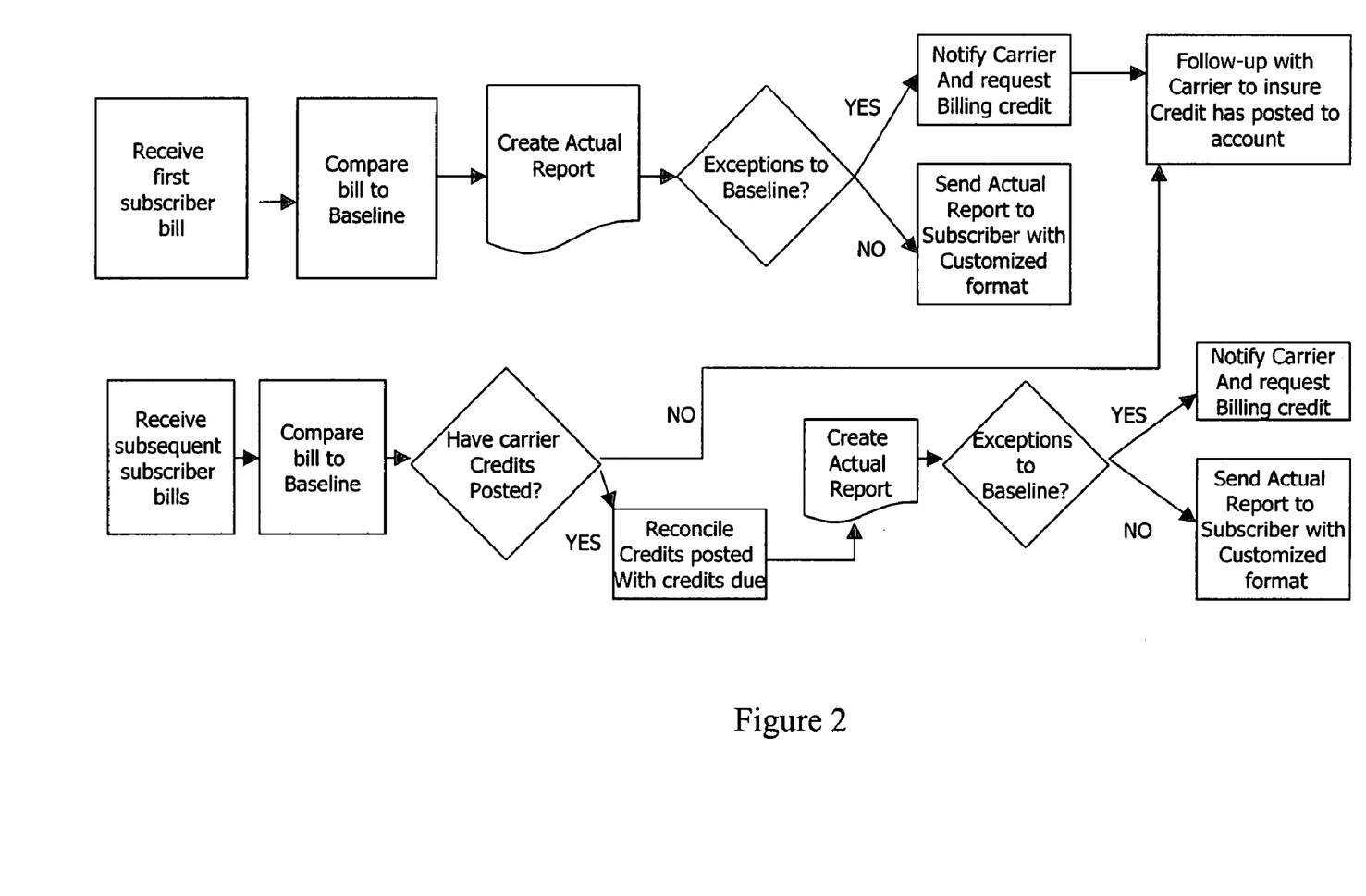
Figure 3:
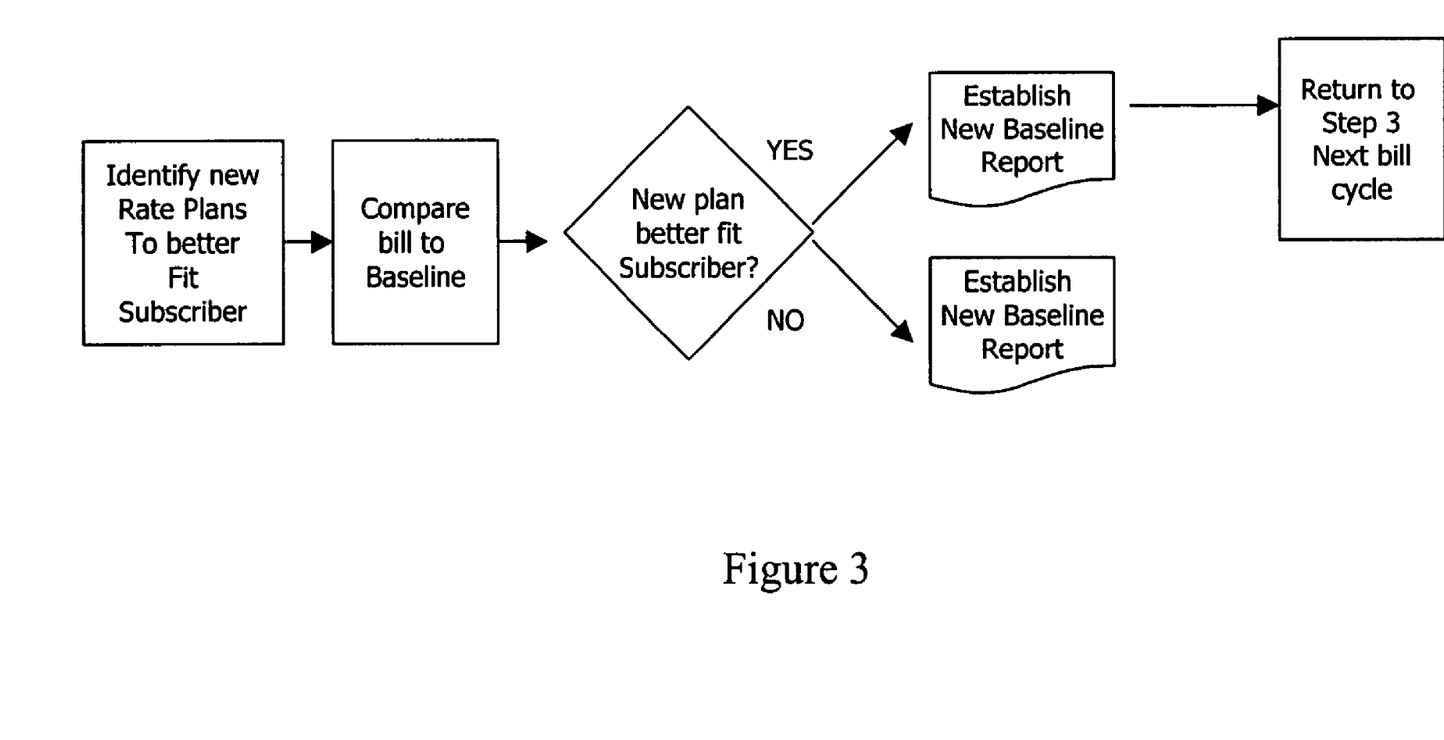

Turning now to FIGS. 2 and 3, there is shown in a flow chart fashion the additional steps of the present method. There is noted the comparison of actual bills received by the subscriber to the baseline report. If there are exceptions to that baseline report, a carrier is notified and credit is requested. Subsequent bills are similarly compared to the baseline and tracked for accuracy then for confirmation that past credits have been posted.

Figure 4:
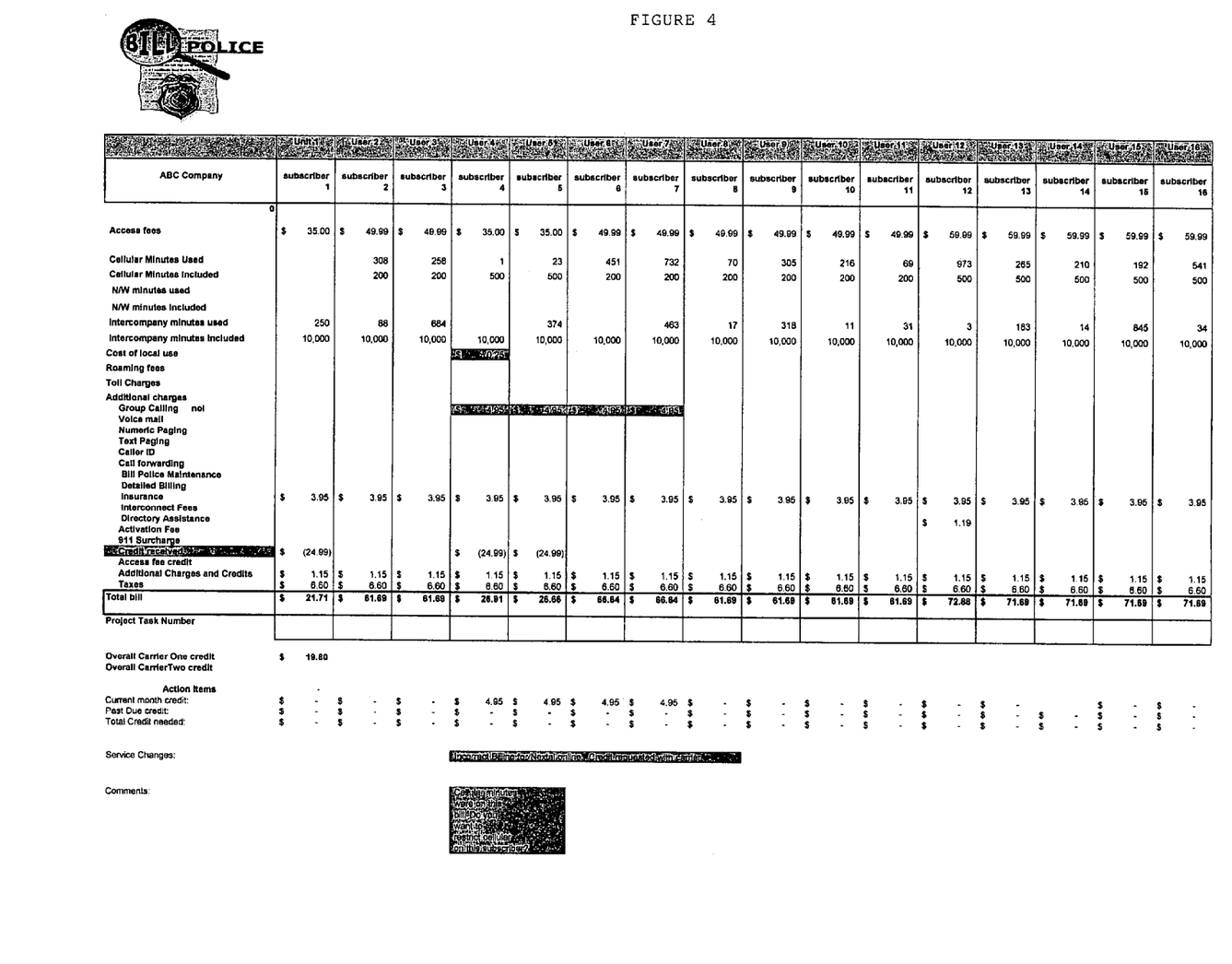
FIGS. 4 and 4A demonstrate an actual comparison of a monthly bill from a carrier to the baseline.
Figure 4A:
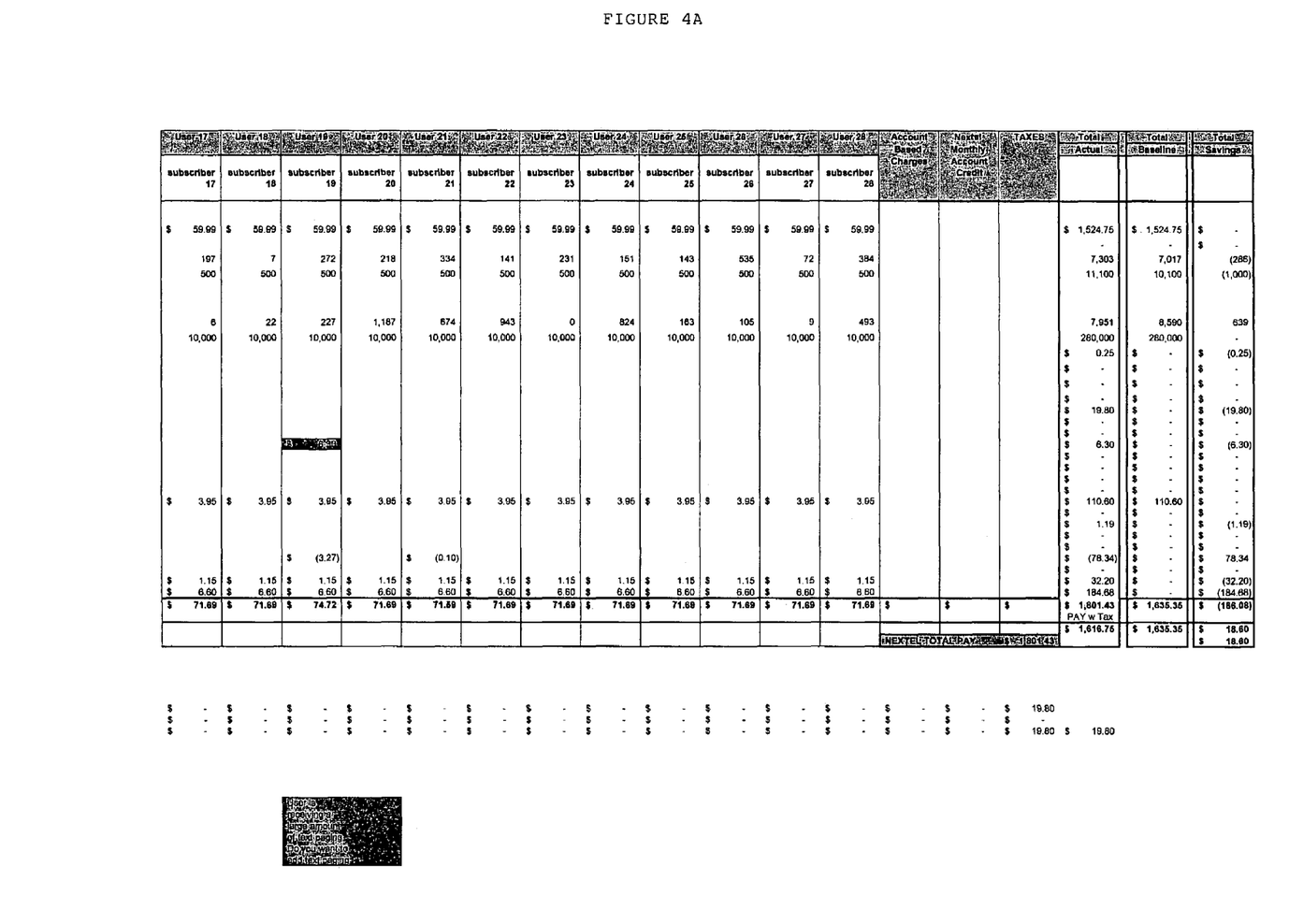

A second component of the present method is the comparison of the actual monthly bill from the carrier to the baseline (retrospective—see FIGS. 4 and 4A). This actual billing template report must show all users in the same format of the baseline with current monthly billing totals. This allows for direct apples to apples comparison of the monthly bill to the predicted, managed baseline. The totals must be separated by user with all detailed costs matching the amount of the carrier bill to the penny. This amount owed to the carrier needs to clearly illustrated for payment to the carrier by the subscriber.

The actual baseline template may further contain a mechanism for flagging any exceptions to the baseline. The exceptions may be incorrect billing items, or simply an alert to the subscriber that they are going over minutes, are receiving roaming fees when their plan does not cover calls in that particular area, etc. Any comparison that is different than baseline figures or that causes additional charges is considered an "exception" and needs to have the ability to be flagged as such. These flags are explained in detail in the "comments section", described below.

An additional field that may be included in the actual bill template is the "carrier credit received" field. This field illustrates any credits posted by the carrier to the bill from previous credit requests over previous billing cycles. This field reconciles the "credits due" section described below.

The actual template may also contain a section for "Action Items" which contains several additional subset components. The first is for credits due. This component shows any incorrect billing exceptions to the baseline which are indeed billing errors. The carrier is then notified of these errors for subsequent billing credits. The credits are tracked on the actual report until there is resolution and a credit posted to the account (in the carrier credit received field). The credits due should be shown both by subscriber and by the total account.

The second subset under "Action Items" is a comments field for service changes denoting any changes that need to be made on the part of the subscriber. This section shows rate plans changes that need to be completed.

The third subset is comments. This section provides additional comments to be made on the account for informational purposes. This section annotates any of the flagged items that are exceptions to the baseline. (e.g. if there is a roaming charges where one was not projected, the costs are recorded as well as where the roaming charges occurred). Based on the comments, the subscriber can manage costs.

Finally, the actual template report may show the actual total amount compared to the actual total baseline amount and to the "prior" amount to illustrate savings and maintenance efficacy.

Figure 5:
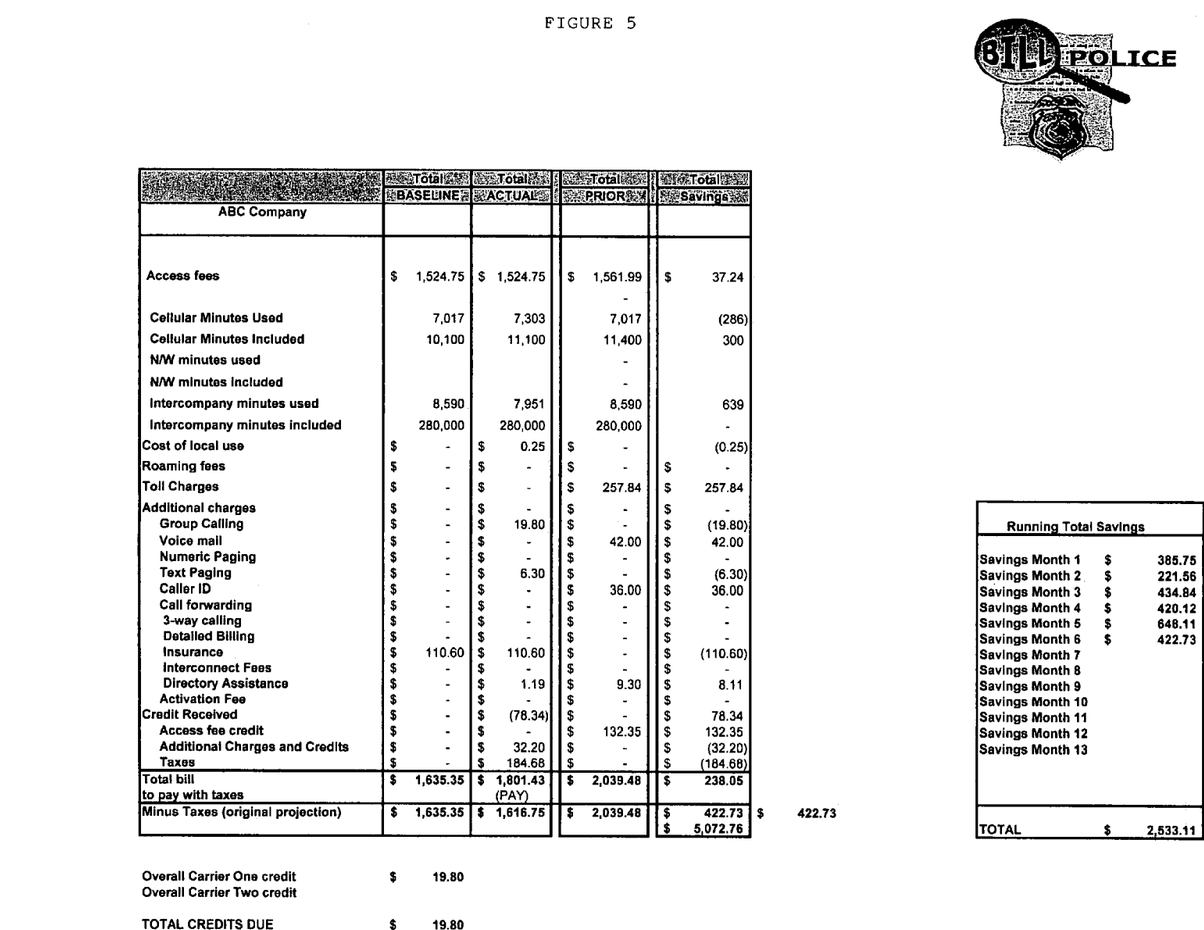
FIG. 5 demonstrates an example of a summary report in accordance with the embodiment of the present method.

A third component of the present method is a summary report (see FIG. 5) which illustrates the costs on the account level and compares the baseline account cost with the actual account cost and the prior account cost. Vital to this summary report is a running total report of savings which shows cumulative cost savings (hard cost only) over the period of the service agreement.

The final component of the present method is prospective comparison of rate plans to the baseline for future movement into other carriers or other rate plans. Historic data is used to compare baseline, actuals and prospective plans to determine the best fit for the subscriber. See FIG. 3.

EXAMPLES

The method has identified three distinct groups, for example, that may be managed. The first two are part of the mobile business users market with 10 or more users. They are the "Super subscribers" and the "Support subscribers". The following outlines the segmentation of the three groups:

Super-Service Accounts (Specific Target Market)

Super service accounts are the typical managed account. They are the subscribers who want their bills managed completely. This means the bill comes first to a third party who will then analyze the bill and manage the wireless bill completely. Subscribers will be able to process their payments directly from the baseline report at the same time distributing costs correctly within the organization. This includes:
- the monthly baseline report showing all usage by subscriber, features and minute charges in one format
- notation of billing errors (incorrect or additional billings)
- submission of corrections to their wireless carrier
- implementation and follow-up for all corrections with the carrier
- flagging of exceptional or erroneous usage
- breakdown of different users by department for billing
- suggestion of new rate plans that will result in a lower monthly cost
- historical management reports to more effectively use the communications process.

Support-Service Accounts (Specific Target Market)

Support service accounts are the same market as the Super service accounts. This group wants help managing the bill, but wants to deal with the carrier directly for correction and changes. They will receive the same reporting services and the same proposed changes for rate plans and credits; however, they are responsible for the implementation of these services directly with their carrier. The support subscribers' services include:

- the monthly report showing all usage by subscriber, features and minute charges in one format
- notation of billing errors (incorrect or additional billings)
- flagging of exceptional or erroneous usage
- breakdown of different users by department for billing
- suggestion of new rate plans that will result in a lower monthly cost.

Self Service Accounts (Non Target Market)

This market is the remaining business users who are not part of a 10 or more subscriber account. They may be a small business or individual business user who is reimbursed by the company for their wireless costs. They recognize a need to better manage their bill, but do not need the comprehensive service of the entire management process. They may just need an easier way to properly determine the costs and necessary credits.

The Self service subscribers' services include:

- the monthly report showing all usage by subscriber, features and minute charges in one format
- notation of billing errors (incorrect or additional billings)
- breakdown of different users
- the idea with the Self service users is for them to have access to an easier way for them to manage their own bills. The Bill Police will provide the format to the users for their monthly service cost with no additional support. If the Self service subscriber needs additional support, they will need to upgrade to a support or super service subscriber An alternative of the method described herein is a web-based database that will house the subscriber information and give data to the user. This database is created as an internet open source software.

In this alternative, users' bills are read from the internet or hard copy bills and are input by manual data entry into the web database. The billing information is then separated out into 1. Baseline entry and editing for baseline management, 2. Monthly statement entry and editing, 3. Consulting summary reviewing and proofing, 4. Bill Policing for internal assignments of database management, 5. Table maintenance for maintaining rate plan databases and 6. Reports to extract data into meaningful information.

A second alternative of the method invention is spreadsheet paper-based reports mailed to subscribers. Here, the bills come directly to a third party site and are input by manual data entry into the web database. The billing information is input into the baseline originally then input into the "actual" customer statement each month. This is done manually with an excel spreadsheet (see FIG. 2). Finally, the information is input into the "summary report" (see FIG. 3) which is mailed hard copy or emailed to the customer.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A method for managing telecommunication bills for a subscriber, the method comprising the steps of:
    conducting an initial analysis of a subscriber's telecommunication usage requirements, wherein the initial analysis is based at least on the subscriber's predicted telecommunication usage requirements and the subscriber's historical telecommunication usage;
    creating a report based on the initial analysis of the subscriber's telecommunication usage requirements;
    selecting at least one telecommunication carrier plan to conform to the initial analysis;
    receiving a subsequent bill from the carrier corresponding to the subscriber's actual telecommunication usage and containing an actual billed amount;
    comparing the subscriber's actual telecommunication usage to the initial analysis of the subscriber's telecommunication usage requirements to identify differences between the actual usage and the initial analysis;
    identifying instances in which such differences result in additional or unexpected charges;
    updating the initial analysis of the subscriber's telecommunication usage requirements based at least on the subscriber's actual telecommunication usage and on additional subscriber's predicted telecommunication usage requirements;
    comparing the updated analysis to the initial analysis to determine any differences between the updated analysis and the initial analysis;
    determining whether a different telecommunications plan better conforms to the updated analysis based on the comparison of the updated analysis to the initial analysis;
    selecting the different telecommunications plan when the determination indicates that the different telecommunications plan better conforms to the updated analysis;
    determining an anticipated billed amount based on the actual usage;
    comparing the anticipated billed amount to the actual billed amount to identify billing errors in the bill; and
    creating an actual report for the subscriber.

2. The method as described in claim 1, comprising:
    requesting billing credit from the carrier in the amount of the identified errors;
    reviewing a further subsequent bill from the carrier to insure that credit was posted to the subscriber account.

3. The method as described in claim 1, wherein the method is performed on a periodic basis corresponding to the generation of bills by the carrier.

4. The method as described in claim 1, further comprising:
    identifying a new telecommunication carrier plan;
    comparing both the selected carrier plan and the new carrier plan to the analysis and the actual usage;
    deciding whether the new carrier plan better conforms to the analysis and the subscriber's actual usage.

5. The method as described in claim 1, wherein the subscriber comprises a plurality of telecommunication users.

6. The method as described in claim 1, wherein the step of selecting a telecommunication carrier plan to correspond to the analysis of the subscriber's telecommunication usage requirements comprises selecting a plurality of telecommunication carrier plans to correspond to the analysis of the subscriber's telecommunication usage requirements.

7. The method as described in claim 6, wherein the plurality of plans is provided by a plurality of plan carrier.

8. The method as described in claim 1, wherein the analysis of a subscriber's telecommunication usage requirements includes identifying a plurality of telecommunication carrier plans.

9. The method as described in claim 5, wherein the analysis of a subscriber's telecommunication usage requirements corresponds to a plurality of telecommunication users and usage requirements for each user.

10. The method as described in claim 9, wherein the analysis is further based on calling patterns of each user, coverage requirements for each user, and feature needs of each user.

11. The method as described in claim 9, wherein the analysis is further based on an organizational departmentalization for each user.

12. The method as described in claim 1, wherein the subscriber is part of a business entity.

* * * * *